(No Model.)
H. J. SACKSTEDER.
UNICYCLE.
No. 521,673.  Patented June 19, 1894.
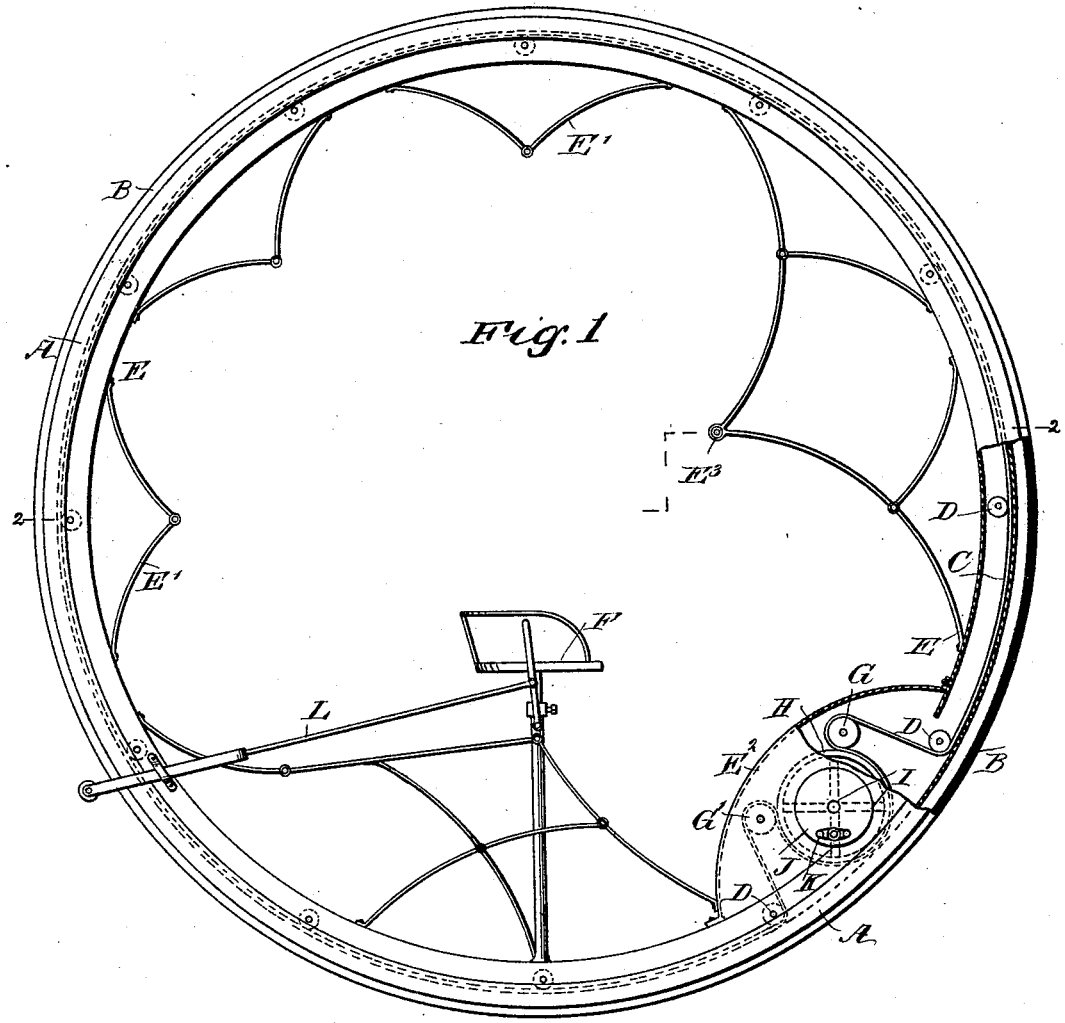
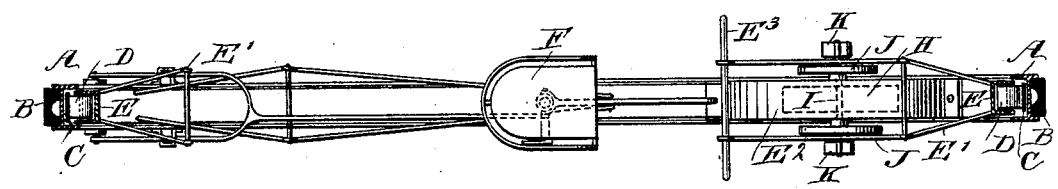
WITNESSES:
INVENTOR
H. J. Sacksteder
BY
ATTORNEYS.

UNITED STATES PATENT OFFICE.

HENRY J. SACKSTEDER, OF LOUISVILLE, KENTUCKY.

UNICYCLE.

SPECIFICATION forming part of Letters Patent No. 521,673, dated June 19, 1894.

Application filed October 17, 1893. Serial No. 488,360. (No model.)

*To all whom it may concern:*

Be it known that I, HENRY J. SACKSTEDER, of Louisville, in the county of Jefferson and State of Kentucky, have invented a new and Improved Unicycle, of which the following is a full, clear, and exact description.

The object of the invention is to provide a new and improved unicycle, which is simple and durable in construction, very effective in operation, and arranged to require little power for rapid propulsion.

The invention consists of an exterior rim, a wheel for supporting the rider, and a traveling belt or chain interposed between the said exterior rim and the wheel rim.

The invention also consists of certain parts and details and combinations of the same, as will be hereinafter described and then pointed out in the claims.

Reference is to be had to the accompanying drawings, forming a part of this specification, in which similar letters of reference indicate corresponding parts in both the figures.

Figure 1 is a side elevation of the improvement with parts in section; and Fig. 2 is a sectional plan view of the same on the line 2—2 of Fig. 1.

The improved unicycle is formed with an exterior rim A, provided with an elastic tire B, and preferably formed with side flanges, as plainly indicated in Fig. 2. The inner face of the rim A is engaged by a belt or chain C, held in contact with the said rim face by rollers D, journaled in suitable bearings in the rim of a wheel E, provided with strengthening ribs E', preferably made segmental, with two adjacent segments connected with each other, as plainly illustrated in Fig. 1. This wheel E supports from its bottom, the seat F for the rider. The belt or chain C between two adjacent rollers D passes over additional rollers G, G', and a driving wheel H, all journaled in a suitable casing or extension E², formed on the inside of the rim of the wheel E. The driving wheel H has its shaft I, extending beyond the sides of the casing E² and on the outer ends of the said shaft are secured the treadle disks J, carrying the treadles K, adapted to be engaged by the rider seated on the seat F. A suitable brake mechanism L, under the control of the operator seated in the seat F permits of braking the tire B held in the exterior rim A.

The operation is as follows: The rider after being seated in the seat F, works the treadles K with his feet, so as to rotate the shaft I and consequently the driving wheel H, whereby a traveling motion is imparted to the chain or belt C passing over the said wheel H, and the rollers G, G' and rollers D. As the belt is in contact with the inner face of the exterior rim A, a rotary motion is given to the said rim and consequently the latter rolls off on the ground, thus propelling the unicycle forward or backward according to the direction in which the treadles K are turned. It will be seen that by this arrangement the operator is enabled to quickly propel the machine; and in order to steer the same I provide the framework or strengthening ribs E' of the wheel E with a transversely-extending handle $E^3$, as plainly shown in the drawings, and under the control of the operator. The operator, by pressing either end of the handle $E^3$ causes the machine to turn in the opposite direction.

Having thus fully described my invention, I claim as new and desire to secure by Letters Patent—

1. A unicycle comprising an exterior rim, a wheel for supporting the rider, a traveling belt or chain interposed between the said exterior rim and the rim of the wheel, and means for driving said belt substantially as shown and described.

2. A unicycle comprising an exterior rim having a tire, a wheel for supporting the rider and provided in its rim with friction rollers, a traveling belt or chain interposed between the said exterior rim and the said friction rollers, and means for driving said belt substantially as shown and described.

3. A unicycle comprising an exterior rim having a tire, a wheel for supporting the rider and provided in its rim with friction rollers, a traveling belt or chain interposed between the said exterior rim and the said friction rollers, and a driving wheel provided with treadles and over which passes the said belt or chain, substantially as shown and described.

4. A unicycle comprising an exterior rim having a tire, a wheel for supporting the rider and provided in its rim with friction rollers, a traveling belt or chain interposed between the said exterior rim and the said friction rollers, a driving wheel provided with treadles and over which passes the said belt or chain, and an additional set of friction rollers for holding the said belt or chain to the rim of the said driving wheel, substantially as shown and described.

5. A unicycle comprising an exterior rim having a tire, a wheel for supporting the rider and provided in its rim with friction rollers, a traveling belt or chain interposed between the said exterior rim and the said friction rollers, a driving wheel provided with treadles and over which passes the said belt or chain, disks held on the shaft for the said driving wheel, and treadles held on the said disks, substantially as shown and described.

HENRY J. SACKSTEDER.

Witnesses:
 WM. F. WOOD,
 ROBT. FRYER.